US012643346B2

(12) United States Patent     (10) Patent No.:   US 12,643,346 B2

Motomitsu        (45) Date of Patent:     Jun. 2, 2026

(54) PNEUMATIC TIRE

(71) Applicant: The Yokohama Rubber Co., LTD., Tokyo (JP)

(72) Inventor: Takamasa Motomitsu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1032 days.

(21) Appl. No.: 17/281,763

(22) PCT Filed: Jun. 18, 2019

(86) PCT No.: PCT/JP2019/024161

§ 371 (c)(1),
(2) Date: Mar. 31, 2021

(87) PCT Pub. No.: WO2020/084830

PCT Pub. Date: Apr. 30, 2020

(65) Prior Publication Data

US 2021/0379933 A1     Dec. 9, 2021

(30) Foreign Application Priority Data

Oct. 23, 2018    (JP) ................................. 2018-199372

(51) Int. Cl.
   B60C 9/18        (2006.01)
   B60C 9/08        (2006.01)
       (Continued)

(52) U.S. Cl.
   CPC ............ B60C 9/08 (2013.01); B60C 11/0083 (2013.01); *B60C 3/04* (2013.01);
       (Continued)

(58) Field of Classification Search
   CPC ........... B60C 9/18; B60C 9/20; B60C 9/2003; B60C 9/2006; B60C 9/2009;
       (Continued)

(56) References Cited

U.S. PATENT DOCUMENTS 3,841,372 A    10/1974   Boileau
4,696,335 A   *   9/1987   Tsukagoshi ........... B60C 9/2009
                                     152/526

(Continued)

FOREIGN PATENT DOCUMENTS

CN      104070933 A    10/2014
CN      104321206 A    1/2015

(Continued)

OTHER PUBLICATIONS

Machine Translation:JP-08276708-A, Endo H, (Year: 2024).*

(Continued)

*Primary Examiner* — Kendra Ly

(74) *Attorney, Agent, or Firm* — Thorpe North & Western

(57)            ABSTRACT

The pneumatic tire includes a carcass layer, a belt layer disposed on an outer side of the carcass layer in a radial direction, and a tread rubber disposed on an outer side of the belt layer in the radial direction. Additionally, the carcass layer has a cord angle of 80° or more and 100° or less. Additionally, the belt layer is formed by layering a first reinforcing belt, a second reinforcing belt that is narrower than the first reinforcing belt, and an auxiliary belt that is spaced apart from a tire equatorial plane and disposed between the carcass layer and the first reinforcing belt. Additionally, the first reinforcing belt and the second reinforcing belt have cord angles of 11° or more and 30° or less, and the auxiliary belt has a cord angle of 55° or more and 70° or less.

15 Claims, 6 Drawing Sheets

(51) Int. Cl.

| | | |
|---|---|---|
| *B60C 11/00* | (2006.01) | |
| *B60C 3/04* | (2006.01) | |
| *B60C 9/20* | (2006.01) | |

(52) U.S. Cl.
CPC ................. *B60C 2009/2016* (2013.01); *B60C 2009/2019* (2013.01); *B60C 2009/2022* (2013.01); *B60C 2009/2077* (2013.01); *B60C 2011/0033* (2013.01)

(58) Field of Classification Search
CPC .... B60C 2009/2012; B60C 2009/2016; B60C 2009/2019; B60C 2009/2022; B60C 2009/2025; B60C 2009/2029
See application file for complete search history.

(56) References Cited

U.S. PATENT DOCUMENTS

| | | | | |
|---|---|---|---|---|
| 4,840,213 A | * | 6/1989 | Koseki | ............... B60C 15/0607 152/538 |
| 4,883,108 A | * | 11/1989 | Takahashi | ............. B60C 9/2009 152/534 |
| 5,404,925 A | * | 4/1995 | Sato | ...................... B60C 9/2006 152/526 |
| 5,435,369 A | * | 7/1995 | Yap | ........................... B60C 9/22 152/526 |
| 5,591,284 A | * | 1/1997 | Gaudin | ................. B60C 9/2006 152/526 |
| 2004/0069392 A1 | * | 4/2004 | Maruoka | ................... B60C 3/04 152/209.1 |
| 2005/0006018 A1 | * | 1/2005 | Maruoka | ............. B60C 15/0027 152/543 |
| 2010/0122761 A1 | | 5/2010 | Miyake | |
| 2013/0139943 A1 | * | 6/2013 | Todoroki | ............... B60C 15/04 152/539 |
| 2014/0158270 A1 | | 6/2014 | Matsumoto | |
| 2015/0165822 A1 | | 6/2015 | Koutoku | |
| 2015/0273943 A1 | | 10/2015 | Kotoku | |
| 2017/0151836 A1 | * | 6/2017 | Rehab | ................... B60C 9/1835 |
| 2018/0037064 A1 | * | 2/2018 | Ichihara | ............... B60C 9/0007 |
| 2018/0201067 A1 | * | 7/2018 | Guerbert-Jubert | ...... B60C 15/06 |
| 2019/0054777 A1 | * | 2/2019 | Nishio | ............... B60C 15/0635 |

FOREIGN PATENT DOCUMENTS

| | | | | | |
|---|---|---|---|---|---|
| CN | 104703811 A | | 6/2015 | | |
| DE | 10 2009 051 136 A1 | | 5/2010 | | |
| EP | 119152 A | * | 9/1984 | .......... | B60C 1/0016 |
| EP | 192910 A | * | 9/1986 | .............. | B60C 3/04 |
| EP | 0 955 186 A2 | | 11/1999 | | |
| EP | 2 332 744 A2 | | 6/2011 | | |
| EP | 2743098 A2 | | 6/2014 | | |
| JP | 61-44006 A | | 3/1986 | | |
| JP | 62178404 A | * | 8/1987 | | |
| JP | 3-57703 A | | 3/1991 | | |
| JP | 08276708 A | * | 10/1996 | | |
| JP | 2008-24105 A | | 2/2008 | | |
| JP | 2008024105 A | * | 2/2008 | | |
| JP | 2011-183857 A | | 9/2011 | | |
| JP | 2013-184552 A | | 9/2013 | | |
| JP | 2014-113957 A | | 6/2014 | | |
| JP | 2015054626 A | * | 3/2015 | | |
| JP | 2017-500246 A | | 1/2017 | | |
| KR | 10-2015-0036359 A | | 4/2015 | | |
| KR | 10-2015-0064159 A | | 6/2015 | | |
| WO | 2014/010093 A1 | | 1/2014 | | |
| WO | 2014/057552 A1 | | 4/2014 | | |

OTHER PUBLICATIONS

Machine Translation: JP-2015054626-A, Ueda Y, (Year: 2024).*
Machine Translation: JP-2008024105-A, Kanamaru S, (Year: 2024).*
Machine Translation: JP62178404A, Ikeda Hiromichi, (Year: 2024).*
Extended European Search Report for Application No. 23154905. 6-1012, dated Apr. 24, 2023.

* cited by examiner

| | | Conventional Example | Comparative Example | Example 1 | Example 2 | Example 3 | Example 4 | Example 5 |
|---|---|---|---|---|---|---|---|---|
| First Reinforcing Belt | Cord Angle (°) | 31 | 33 | 28 | 22 | 13 | 22 | 22 |
| | De1/(TDW/2) | 0.65 | 0.69 | 0.65 | 0.65 | 0.65 | 0.65 | 0.65 |
| Second Reinforcing Belt | Cord Angle (°) | 31 | 19 | 28 | 22 | 13 | 22 | 22 |
| | De2/(TDW/2) | 0.60 | 0.76 | 0.60 | 0.60 | 0.60 | 0.60 | 0.60 |
| First Protection Belt | Cord Angle (°) | 31 | 24 | 31 | 31 | 31 | 31 | 31 |
| | De3/(TDW/2) | 0.60 | 0.94 | 0.60 | 0.60 | 0.60 | 0.60 | 0.60 |
| Second Protection Belt | Cord Angle (°) | 31 | 24 | 31 | 31 | 31 | 31 | 31 |
| | De4/(TDW/2) | 0.50 | 0.58 | 0.50 | 0.50 | 0.50 | 0.50 | 0.50 |
| Auxiliary Belt | Number of layers | 0 | 1 | 1 | 1 | 1 | 1 | 1 |
| | Cord Angle (°) | - | 16 | 80 | 80 | 80 | 57 | 65 |
| | De5/(TDW/2) | - | 0.38 | 0.30 | 0.30 | 0.30 | 0.30 | 0.30 |
| | De5'/(TDW/2) | - | 0.11 | 0.50 | 0.50 | 0.50 | 0.50 | 0.50 |
| | De5/De1 | - | 0.55 | 0.46 | 0.46 | 0.46 | 0.46 | 0.46 |
| | Wb5/(TDW/2) | - | 0.51 | 0.20 | 0.20 | 0.20 | 0.20 | 0.20 |
| Dt/SH | | 0.100 | 0.100 | 0.100 | 0.100 | 0.100 | 0.100 | 0.100 |
| | Heat Build-up Resistance Performance | 100 | 105 | 110 | 115 | 110 | 121 | 130 |
| | Belt Edge Durability Performance | 100 | 110 | 110 | 115 | 110 | 118 | 130 |

FIG. 4A

| | | Example 6 | Example 7 | Example 8 | Example 9 | Example 10 | Example 11 | Example 12 |
|---|---|---|---|---|---|---|---|---|
| First Reinforcing Belt | Cord Angle (°) | 22 | 22 | 22 | 22 | 22 | 22 | 22 |
| | De1/(TDW/2) | 0.65 | 0.65 | 0.65 | 0.72 | 0.85 | 0.93 | 0.85 |
| Second Reinforcing Belt | Cord Angle (°) | 22 | 22 | 22 | 22 | 22 | 22 | 22 |
| | De2/(TDW/2) | 0.60 | 0.60 | 0.60 | 0.60 | 0.60 | 0.60 | 0.60 |
| First Protection Belt | Cord Angle (°) | 31 | 31 | 31 | 31 | 31 | 31 | 31 |
| | De3/(TDW/2) | 0.60 | 0.60 | 0.60 | 0.60 | 0.60 | 0.60 | 0.60 |
| Second Protection Belt | Cord Angle (°) | 31 | 31 | 31 | 31 | 31 | 31 | 31 |
| | De4/(TDW/2) | 0.50 | 0.50 | 0.50 | 0.50 | 0.50 | 0.50 | 0.50 |
| Auxiliary Belt | Number of layers | 1 | 1 | 1 | 1 | 1 | 1 | 1 |
| | Cord Angle (°) | 68 | 65 | 65 | 65 | 65 | 65 | 65 |
| | De5/(TDW/2) | 0.30 | 0.30 | 0.30 | 0.30 | 0.30 | 0.30 | 0.10 |
| | De5'/(TDW/2) | 0.50 | 0.50 | 0.50 | 0.50 | 0.50 | 0.50 | 0.50 |
| | De5/De1 | 0.46 | 0.46 | 0.46 | 0.42 | 0.35 | 0.32 | 0.12 |
| | Wb5/(TDW/2) | 0.20 | 0.20 | 0.20 | 0.20 | 0.20 | 0.20 | 0.40 |
| Dt/SH | | 0.100 | 0.040 | 0.060 | 0.060 | 0.060 | 0.060 | 0.060 |
| | Heat Build-up Resistance Performance | 118 | 140 | 138 | 145 | 155 | 150 | 160 |
| | Belt Edge Durability Performance | 121 | 135 | 140 | 150 | 155 | 145 | 160 |

FIG. 4B

| | | Example 13 | Example 14 | Example 15 | Example 16 | Example 17 | Example 18 |
|---|---|---|---|---|---|---|---|
| First Reinforcing Belt | Cord Angle (°) | 22 | 22 | 22 | 22 | 22 | 22 |
| | De1/(TDW/2) | 0.85 | 0.85 | 0.85 | 0.85 | 0.85 | 0.85 |
| Second Reinforcing Belt | Cord Angle (°) | 22 | 22 | 22 | 22 | 22 | 22 |
| | De2/(TDW/2) | 0.60 | 0.60 | 0.60 | 0.60 | 0.60 | 0.60 |
| First Protection Belt | Cord Angle (°) | 31 | 31 | 31 | 31 | 31 | 22 |
| | De3/(TDW/2) | 0.60 | 0.60 | 0.60 | 0.90 | 0.80 | 0.90 |
| Second Protection Belt | Cord Angle (°) | 31 | 31 | 31 | 31 | 31 | 22 |
| | De4/(TDW/2) | 0.50 | 0.50 | 0.50 | 0.50 | 0.50 | 0.50 |
| | Number of layers | 1 | 1 | 1 | 1 | 1 | 1 |
| Auxiliary Belt | Cord Angle (°) | 65 | 65 | 65 | 65 | 65 | 65 |
| | De5/(TDW/2) | 0.14 | 0.09 | 0.40 | 0.40 | 0.40 | 0.40 |
| | De5'/(TDW/2) | 0.38 | 0.38 | 0.20 | 0.20 | 0.20 | 0.20 |
| | De5/De1 | 0.16 | 0.11 | 0.47 | 0.47 | 0.47 | 0.47 |
| | Wb5/(TDW/2) | 0.48 | 0.53 | 0.40 | 0.40 | 0.40 | 0.40 |
| Dt/SH | | 0.060 | 0.060 | 0.060 | 0.060 | 0.060 | 0.060 |
| | Heat Build-up Resistance Performance | 165 | 170 | 180 | 185 | 185 | 190 |
| | Belt Edge Durability Performance | 165 | 170 | 180 | 190 | 185 | 195 |

FIG. 4C

PNEUMATIC TIRE

TECHNICAL FIELD

The technology relates to a pneumatic tire and particularly relates to a pneumatic tire with improved belt edge durability performance.

BACKGROUND ART

An off-the-road tire (OR Tire) mountable on a construction or industrial vehicle includes an auxiliary belt disposed between a carcass layer and a pair of reinforcing belts as an additional reinforcing material for improving the durability of the tire. An example of a conventional OR tire that is configured in this manner is the technology described in Japan Unexamined Patent Publication No. 2017-500246.

Meanwhile, in recent years, OR tires have been developed with lowered aspect ratios in response to the evolution of heavy or construction machinery. An OR tire with a low aspect ratio can provide improved applied load capacity while maintaining the tire outer diameter, however, such a tire also increases the load index (k-factor) and thus the deflection amount of the tire. Accordingly, there is a problem that separation of the peripheral rubber tends to occur at end portions of the belt plies.

SUMMARY

The technology provides a pneumatic tire with improved belt edge durability performance.

The pneumatic tire according to an embodiment of the technology includes a carcass layer, a belt layer disposed on an outer side of the carcass layer in a radial direction, and a tread rubber disposed on an outer side of the belt layer in the radial direction, the carcass layer having a cord angle of 80° or more and 100° or less, the belt layer being formed by layering a first reinforcing belt, a second reinforcing belt that is narrower than the first reinforcing belt, and an auxiliary belt that is spaced apart from a tire equatorial plane and disposed between the carcass layer and the first reinforcing belt, the first reinforcing belt and the second reinforcing belt having cord angles of 11° or more and 30° or less, and the auxiliary belt having a cord angle of 55° or more and 70° or less.

According to the pneumatic tire according to embodiments of the technology, an auxiliary belt having a cord angle of 55° or more and 70° or less is advantageous in that the cord angle of the auxiliary belt is appropriately set to improve the belt edge durability performance of the tire. Specifically, the lower limit described above allows for the difference in cord angles between adjacent auxiliary belts and carcass layers to be reduced, and the interlayer strain to be reduced, thereby suppressing separation of the peripheral rubber at end portions of the auxiliary belt. Also, the upper limit described above allows for radial growth in the shoulder region in the tread portion to be suppressed, thereby suppressing separation of the peripheral rubber at end portions of the belt layer.

BRIEF DESCRIPTION OF DRAWINGS

FIGS. 4A-4B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
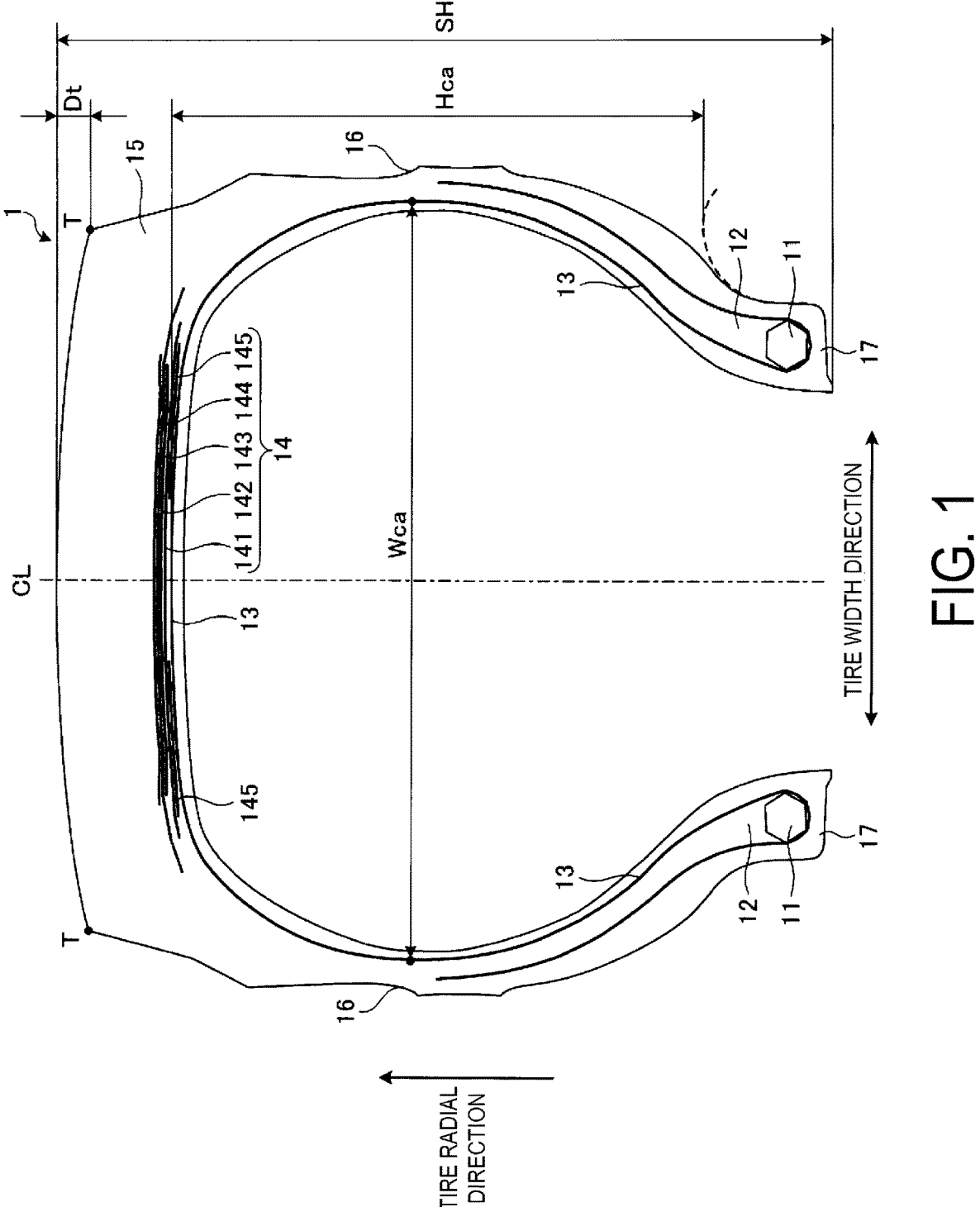
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. The same drawing illustrates an OR tire mountable on a construction or industrial vehicle as an example of the pneumatic tire according to an embodiment of the technology.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made of steel by multiple times in an annular shape and are embedded in the bead portion to constitute a core of the left and right bead portions. The pair of bead fillers 12, 12 are disposed on an outer circumference of the pair of bead cores 11, 11 in the tire radial direction and reinforce the bead portions.

The carcass layer 13 has a single layer structure made from one carcass ply or a multilayer structure made from a plurality of stacked carcass plies and spans between the left and right bead cores 11, 11 in a toroidal shape to form the framework of the tire. Additionally, both end portions of the carcass layer 13 are turned back to an outer side in the tire width direction so as to wrap around the bead cores 11 and the bead fillers 12 and fixed. The carcass ply of the carcass layer 13 is formed by performing a rolling process on coating rubber-covered carcass cords made from steel and has a cord angle (defined as the inclination angle in the longitudinal direction of the carcass cords with respect to the tire circumferential direction) being 80° or more and 100° or less. Also, a cord diameter of the carcass cord is in a range of 2.2 mm or more and 4.5 mm or less.

The belt layer 14 is a multilayer structure including a plurality of belt plies 141 to 145 and is disposed around the outer circumference of the carcass layer 13. These belt plies 141 to 145 include two or more reinforcing belts 141, 142, one or more protection belts 143, 144, and one or more auxiliary belts 145. A detailed configuration of each of the belt plies 141 to 145 is described below.

The tread rubber 15 is disposed on the outer circumference of the carcass layer 13 and the belt layer 14 in the tire radial direction and constitutes a tread portion. The pair of sidewall rubbers 16, 16 are disposed on an outer side of the carcass layer 13 in the tire width direction and constitute left and right sidewall portions. The pair of rim cushion rubbers 17, 17 are disposed on an inner side in the tire radial direction of the turned back portions of the carcass layer 13 and the left and right bead cores 11, 11 to form a rim-fitting surface of the bead portion.

Belt Layer

Figure 2:
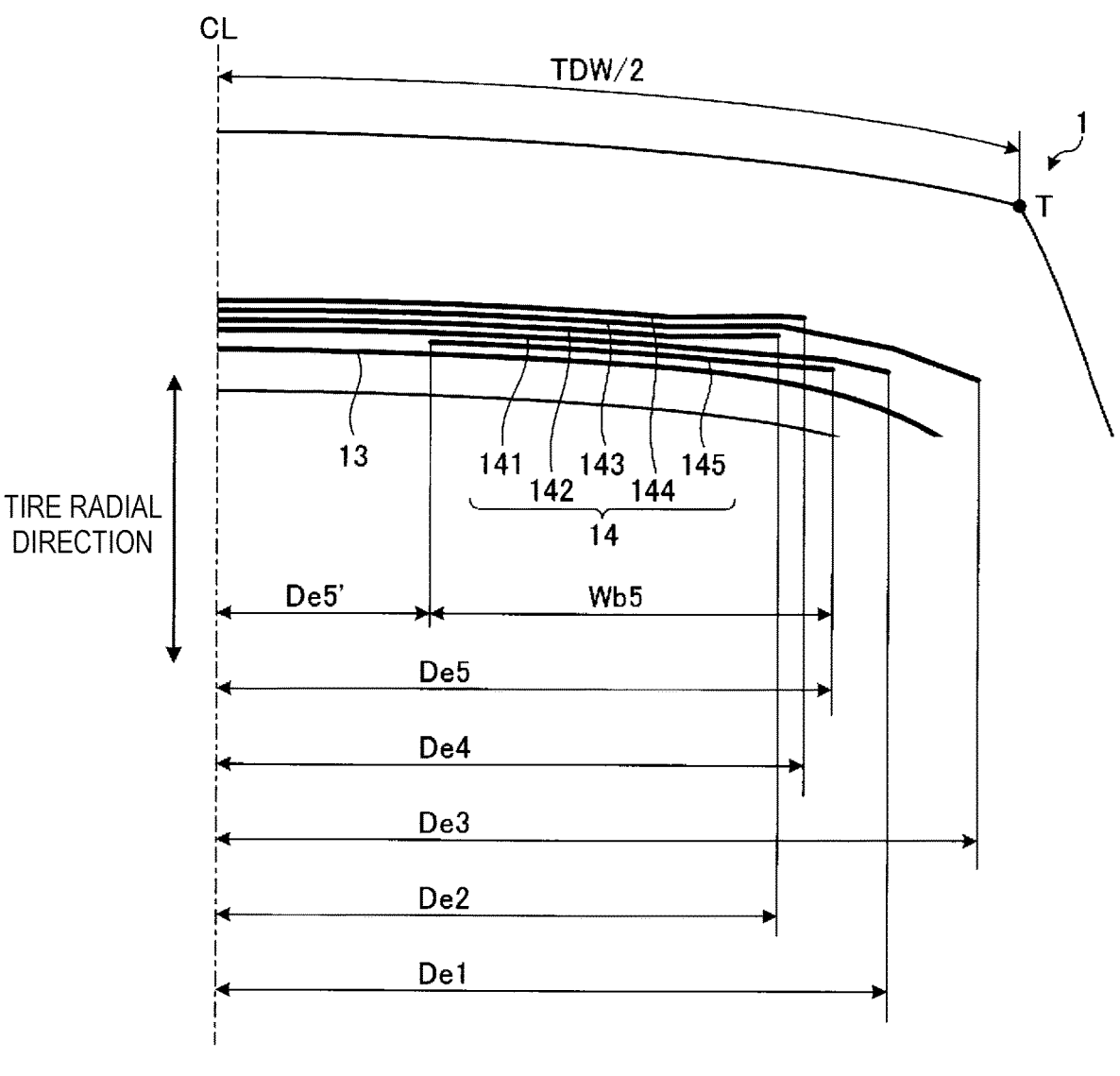
FIG. 2 is an explanatory diagram illustrating a belt layer of the pneumatic tire illustrated in FIG. 1.

FIG. 2 is an explanatory diagram illustrating the belt layer of the pneumatic tire illustrated in FIG. 1. The same drawing illustrates a half region of a tread portion demarcated by the tire equatorial plane CL.

As described above, the belt layer 14 is formed by layering a plurality of belt plies 141 to 145 including two or more reinforcing belts 141, 142, one or more protection belts 143, 144, and one or more auxiliary belts 145.

Each of the belt plies 141 to 144 extends continuously in the tire width direction across the tire equatorial plane CL. Additionally, each of the belt plies 141 to 144 has a left-right symmetrical structure centered on the tire equatorial plane CL. Furthermore, adjacent belt plies 141, 142; 142, 143; 143, 144 have cord angles (defined as the inclination angle in the longitudinal direction of the belt cords with respect to the tire circumferential direction) of opposite signs and are stacked so that the longitudinal directions of the belt cords intersect each other (having so-called a crossply structure).

The first reinforcing belt 141 is made by performing a rolling process on coating rubber-covered belt cords made of steel and has a cord angle, as an absolute value, of 11° or more and 30° or less, preferably, 18° or more and 26° or less. Additionally, the first reinforcing belt 141 is disposed on an outer side of the carcass layer 13 in the tire radial direction.

The second reinforcing belt 142 is made by performing a rolling process on coating rubber-covered belt cords made of steel and has a cord angle, as an absolute value, of 11° or more and 30° or less, preferably, 14° or more and 22° or less. Also, the second reinforcing belt 142 is disposed in a layered manner on an outer side of the first reinforcing belt 141 in the tire radial direction.

Additionally, an outer diameter of a belt cord forming the reinforcing belts 141, 142 is in a range of 2.0 mm or more and 4.5 mm or less, preferably 2.2 mm or more and 3.0 mm or less. Additionally, the number of ends of the belt cords forming the reinforcing belts 141, 142 is in a range of 14 ends/50 mm or more and 22 ends/50 mm or less, preferably, 16 ends/50 mm or more and 20 ends/50 mm or less.

In a configuration in which the cord is formed of a plurality of twisted wires, the cord diameter is measured as the diameter of a circumscribed circle of the cord in a radial cross-sectional view.

Also, in the configuration of FIG. 2, the narrower second reinforcing belt 142 is disposed in a layered manner on an outer side of the wider first reinforcing belt 141 in the tire radial direction. However, no such limitation is intended, and the narrower second reinforcing belt 142 may be disposed in a layered manner on an inner side of the wider first reinforcing belt 141 in the tire radial direction (not illustrated).

Furthermore, a third reinforcing belt (not illustrated) may be disposed in a layered manner. In this case, the third reinforcing belt may be disposed on an inner side or on an outer side (not illustrated) of the first reinforcing belt 141 and the second reinforcing belt 142 in the radial direction. Alternatively, the third reinforcing belt may be disposed to be interposed between the first reinforcing belt 141 and the second reinforcing belt 142 (not illustrated). In these cases, the widest reinforcing belt is defined as the first reinforcing belt 141 described above, and the narrowest reinforcing belt is defined as the second reinforcing belt 142 described above.

The first protection belt 143 is made by performing a rolling process on coating rubber-covered belt cords made of steel and has a cord angle, as an absolute value, of 11° or more and 30° or less, preferably, 19° or more and 27° or less. Also, the first protection belt 143 is disposed in a layered manner on an outer side of the first reinforcing belt 141 and the second reinforcing belt 142 in the radial direction. Also, the first protection belt 143 is wider than the first reinforcing belt 141 and the second reinforcing belt 142 as described below, and disposed to entirely cover these reinforcing belts 141, 142 from an outer side in the radial direction. Also, a cord diameter of a belt cord forming the first protection belt 143 is narrower than the cord diameter of the belt cords of the first reinforcing belt 141 and the second reinforcing belt 142. Additionally, a difference between the cord diameters of the first reinforcing belt 141 and the second reinforcing belt 142 and the cord diameter of the first protection belt 143 preferably is in a range of 0.1 mm or more and 0.5 mm or less.

The second protection belt 144 is made by performing a rolling process on coating rubber-covered belt cords made of steel and has a cord angle, as an absolute value, of 11° or more and 30° or less, preferably, 19° or more and 27° or less. Also, the second protection belt 144 has a cord angle with an opposite sign with respect to the first protection belt 143, and the belt cords are layered so that the longitudinal directions of the belt cords intersect each other. Also, the second protection belt 144 is narrower than the first protection belt 143, and is disposed in a layered manner on an outer side of the first protection belt 143 in the radial direction.

Additionally, an outer diameter of a belt cord forming the protection belts 143, 144 is in a range of 1.7 mm or more and 4.2 mm or less, preferably 1.9 mm or more and 2.7 mm or less. Additionally, the number of ends of the belt cords forming the protection belts 143, 144 is in a range of 10 ends/50 mm or more and 20 ends/50 mm or less, preferably, 13 ends/50 mm or more and 18 ends/50 mm or less.

Note that the second protection belt 144 may be omitted, and only the first protection belt 143 may be disposed (not illustrated).

Additionally, in FIG. 2, a distance De1 from a tire equatorial plane CL to an end portion of the first reinforcing belt 141 preferably has a relationship $0.70 \leq De1/(TDW/2) \leq 0.95$, more preferably, $0.80 \leq De1/(TDW/2) \leq 0.90$, with respect to a developed tread half-width TDW/2.

The distance to an end portion of a belt ply is the distance in the tire width direction from the tire equatorial plane to the outermost belt cord of the belt ply in the tire width direction, measured when the tire is mounted on a specified rim, inflated to a specified internal pressure, and in an unloaded state.

The developed tread width TDW is the linear distance between the two ends of the tread pattern portion of the tire in a developed view, measured when the tire is mounted on a specified rim, inflated to a specified internal pressure, and in an unloaded state.

Also, as illustrated in FIG. 2, the second reinforcing belt 142 is narrower than the first reinforcing belt 141 and the first protection belt 143, and the end portion of the second reinforcing belt 142 is disposed to be interposed between the first reinforcing belt 141 and the first protection belt 143. Additionally, a distance De2 from the tire equatorial plane CL to the end portion of the second reinforcing belt 142 preferably has a relationship $0.55 \leq De2/(TDW/2) \leq 0.85$, more preferably, $0.65 \leq De2/(TDW/2) \leq 0.75$, with respect to the developed tread half-width TDW/2.

Furthermore, the distance De2 of the second reinforcing belt 142 preferably has a relationship $0.50 \leq De2/De1 \leq 0.90$, more preferably, $0.60 \leq De2/De1 \leq 0.80$, with respect to the distance De1 of the first reinforcing belt 141.

Also, as illustrated in FIG. 2, the first protection belt 143 is wider than the first reinforcing belt 141 and the second reinforcing belt 142, and disposed to entirely cover these reinforcing belts 141, 142 from an outer side in the radial direction. Additionally, a distance De3 from the tire equatorial plane CL to an end portion of the first protection belt 143 preferably has a relationship $0.80 \leq De3/(TDW/2) \leq 0.99$, more preferably, $0.90 \leq De3/(TDW/2) \leq 0.99$, with respect to the developed tread half-width TDW/2.

Also, the distance De3 of the first protection belt 143 preferably has a relationship $0.70 \leq De3/De1 \leq 0.95$, more preferably, $0.80 \leq De3/De1 \leq 0.90$, with respect to the distance De1 of the first reinforcing belt 141. In this way, separation of the peripheral rubber occurring at end portions of the belt plies is suppressed.

Also, as shown in FIG. 2, the second protection belt 144 is narrower than the first protection belt 143, and the end portion of the second protection belt 144 is disposed on an outer circumferential surface of the first protection belt 143. Additionally, a distance De4 from the tire equatorial plane CL to an end portion of the second protection belt 144 preferably has a relationship $0.60 \leq De4/(TDW/2) \leq 0.90$, more preferably, $0.70 \leq De4/(TDW/2) \leq 0.80$, with respect to the developed tread half-width TDW/2. In this way, the distance De4 of the second protection belt 144 is appropriately set.

Also, the distance De4 of the second protection belt 144 preferably has a relationship $0.60 \leq De4/De3 \leq 0.90$, more preferably, $0.65 \leq De4/De3 \leq 0.85$, with respect to the distance De3 of the first protection belt 143.

Also, in the configuration of FIG. 2, the end portions of the first reinforcing belt 141 and the second reinforcing belt 142, as well as the end portions of the first protection belt 143 and the second protection belt 144 are disposed to be offset from each other in the tire width direction. In this way, stress concentration at belt end portions is mitigated.

Auxiliary Belt

As illustrated in FIG. 2, the belt layer 14 includes a single layer auxiliary belt 145. The auxiliary belt 145 has a split structure that is spaced apart from the tire equatorial plane CL and is disposed between the carcass layer 13 and the first reinforcing belt 141. Additionally, the pair of auxiliary belts 145 are disposed having left-right symmetry about the tire equatorial plane CL (see FIG. 1).

Also, the auxiliary belt 145 is made by performing a rolling process on coating rubber-covered belt cords made of steel and has a cord angle, as an absolute value, of 55° or more and 70° or less, preferably, 55° or more and 65° or less. Accordingly, the cord angle of the auxiliary belt 145 is smaller than the cord angle of the adjacent carcass layer 13 (80° or more and 100° or less), and is greater than the cord angle of the adjacent first reinforcing belt 141 (11° or more and 30° or less). Also, a difference between the cord angle of the auxiliary belt 145 and the cord angle of the carcass layer 13 is preferably 25° or more and 45° or less, more preferably, 27° or more and 35° or less. Also, a difference between the cord angle of the auxiliary belt 145 and the cord angle of the first reinforcing belt 141 is preferably 32° or more and 47° or less, more preferably, 36° or more and 43° or less. In this way, the cord angle of the auxiliary belt 145 is appropriately set.

Additionally, an outer diameter of a belt cord forming the auxiliary belt 145 is in a range of 2.0 mm or more and 4.5 mm or less, preferably 2.2 mm or more and 3.0 mm or less. Additionally, the number of ends of the belt cords forming the auxiliary belt 145 is in a range of 13 ends/50 mm or more and 20 ends/50 mm or less, preferably, 15 ends/50 mm or more and 18 ends/50 mm or less.

Also, as illustrated in FIG. 2, the auxiliary belt 145 is narrower than the first reinforcing belt 141, and the two end portions of the auxiliary belt 145 are interposed between the first reinforcing belt 141 and the carcass layer 13. Also, a distance De5 from the tire equatorial plane CL to an outer end portion of the auxiliary belt 145 in the tire width direction preferably has a relationship $0.60 \leq De5/(TDW/2) \leq 0.90$, more preferably, $0.70 \leq De5/(TDW/2) \leq 0.80$, with respect to the developed tread half-width TDW/2.

Additionally, the distance De5 from the tire equatorial plane CL to the outer end portion of the auxiliary belt 145 in the tire width direction preferably has a relationship $0.75 \leq De5/De1 \leq 0.99$, more preferably, $0.85 \leq De5/De1 \leq 0.95$, with respect to the distance De1 of the first reinforcing belt 141. Accordingly, the auxiliary belt 145 is completely disposed on the tire equatorial plane CL side of the end portion of the first reinforcing belt 141.

Also, in the configuration of FIG. 2, the outer end portion of the auxiliary belt 145 is disposed on the tire equatorial plane CL side of the end portion of the narrower second reinforcing belt 142. However, no such limitation is intended, and the outer end portion of the auxiliary belt 145 may be disposed further to an outer side in the tire width direction than the end portion of the narrower second reinforcing belt 142 (not illustrated). Specifically, the outer end portion of the auxiliary belt 145 is preferably disposed to be offset with respect to the end portions of the first reinforcing belt 141 and the second reinforcing belt 142 in the tire width direction.

Also, a distance De5' from the tire equatorial plane CL to an inner end portion of the auxiliary belt 145 in the tire width direction preferably has a relationship $0.10 \leq De5'/(TDW/2) \leq 0.40$, more preferably, $0.12 \leq De5'/(TDW/2) \leq 0.20$, with respect to the developed tread half-width TDW/2.

Additionally, the distance De5' from the tire equatorial plane CL to the inner end portion of the auxiliary belt 145 in the tire width direction preferably has a relationship $0.05 \leq De5'/De5 \leq 0.30$, more preferably, $0.10 \leq De5'/De5 \leq 0.20$, with respect to the distance De5 of the outer end portion of the auxiliary belt 145.

Also, a width Wb5 (=De5−De5') of the auxiliary belt preferably has a relationship $0.40 \leq Wb5/(TDW/2) \leq 0.60$, more preferably, $0.45 \leq Wb5/(TDW/2) \leq 0.55$, with respect to the developed tread half-width TDW/2.

Note that in the configuration of FIG. 1, a single layer and a pair of left and right auxiliary belts 145, 145 are disposed as described above. However, no such limitation is intended, and two or more auxiliary belts may be layered and disposed left and right.

Added Items

Figure 3:
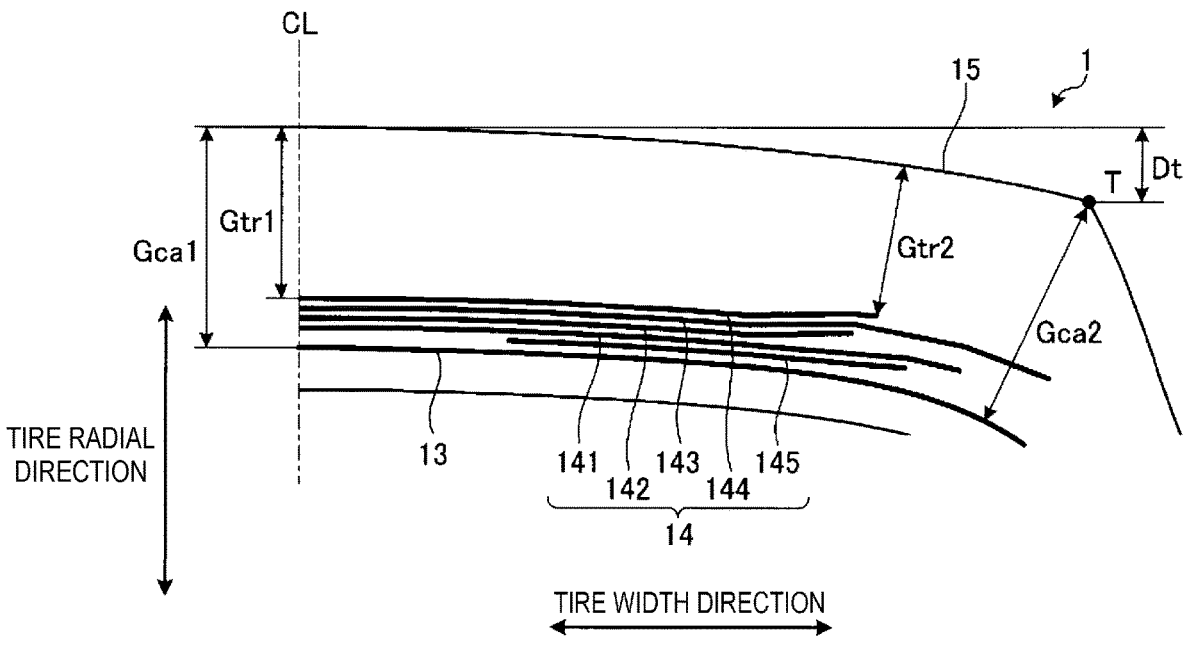
FIG. 3 is an enlarged view illustrating a tread portion of the pneumatic tire illustrated in FIG. 1.

FIG. 3 is an enlarged view illustrating the tread portion of the pneumatic tire illustrated in FIG. 1. The same drawing illustrates a half region of a tread portion demarcated by the tire equatorial plane CL.

In FIG. 3, a shoulder drop amount Dt of a tread profile when the tire is mounted on a specified rim and inflated to a specified internal pressure preferably has a relationship 0.025≤Dt/SH≤0.070, more preferably, 0.035≤Dt/SH≤0.060, with respect to a tire cross-sectional height SH.

Additionally, a shoulder drop amount Dt' of a tread profile when the tire is mounted on a specified rim and inflated to an internal pressure of 0 kPa preferably has a relationship 0.030≤Dt'/SH'≤0.070, more preferably, 0.040≤Dt'/SH'≤0.065, with respect to a tire cross-sectional height SR. The tread profile when the tire is inflated to the internal pressure of 0 kPa corresponds to the shape of the tire mold.

Moreover, in FIG. 3, a distance Gca1 from a tread profile to a carcass profile on the tire equatorial plane CL preferably has a relationship 0.80≤Gca1/Gca2≤1.25, more preferably, 0.90≤Gca1/Gca2≤1.15, with respect to a distance Gca2 from a tread edge T to a carcass profile.

The distance from the tread profile to the carcass profile is measured when the tire is mounted on a specified rim, inflated to a specified internal pressure, and in an unloaded state.

A profile is a contour line in a cross-sectional view along the tire meridian direction, and is measured using a laser profiler in an unloaded state with the tire mounted on a specified rim and inflated to the specified internal pressure. The laser profiler used may be, for example, a tire profile measuring device (available from Matsuo Co., Ltd.).

Additionally, in FIG. 3, a gauge Gtr1 of the tread rubber 15 on the tire equatorial plane CL preferably has a relationship 0.90≤Gtr1/Gtr2≤1.35, more preferably, 1.00≤Gtr1/Gtr2≤1.25, with respect to a gauge Gtr2 of the tread rubber 15 at an end portion position of the outermost layer (that is, the second protection belt 144 in FIG. 3) of the belt layer 14. Additionally, the gauge Gtr1 of the tread rubber 15 on the tire equatorial plane CL is in the range of 65 mm≤Gtr1≤90 mm.

When viewed in a cross-sectional view in the tire meridian direction, a gauge of the tread rubber is measured as the length of a perpendicular line drawn from a tread profile to a belt cord surface of the outermost layer of the belt layer. The belt cord surface is defined as a surface connecting the end portions that are on an outer side in the tire radial direction of the plurality of belt cords forming the belt ply.

Effects

As described above, the pneumatic tire 1 includes a carcass layer 13, a belt layer 14 disposed on an outer side of the carcass layer 13 in the radial direction, and a tread rubber 15 disposed on an outer side of the belt layer 14 in the radial direction (see FIG. 1). Additionally, the carcass layer 13 has a cord angle of 80° or more and 100° or less. Additionally, the belt layer 14 is formed by layering a first reinforcing belt 141, a second reinforcing belt 142 that is narrower than the first reinforcing belt 141, and an auxiliary belt 145 that is spaced apart from the tire equatorial plane CL and disposed between the carcass layer 13 and the first reinforcing belt 141 (see FIG. 2). Additionally, the first reinforcing belt 141 and the second reinforcing belt 142 have cord angles of 11° or more and 30° or less, and the auxiliary belt 145 has a cord angle of 55° or more and 70° or less.

In such a configuration, (1) the auxiliary belt 145 is disposed between the carcass layer 13 and the reinforcing belts 141, 142, and thus radial growth in the shoulder region in the tread portion is suppressed. In this way, there is an advantage that separation of the peripheral rubber at end portions of the belt layer 14 is suppressed and the belt edge durability performance of the tire is improved. Additionally, (2) the auxiliary belt 145 has a so-called split structure in which the auxiliary belt 145 is spaced apart from the tire equatorial plane CL, and thus increase in the gauge of the center region in the tread portion due to the arrangement of the auxiliary belt 145 is suppressed. In this way, there is an advantage that the heat build-up when the tire is rolling is suppressed, and thus heat build-up resistance performance of the tire is ensured. Additionally, (3) the auxiliary belt 145 having a cord angle of 55° or more and 70° or less is advantageous in that the cord angle of the auxiliary belt 145 is appropriately set. In other words, the lower limit described above allows for the difference in cord angles between adjacent auxiliary belts 145 and carcass layers 13 to be reduced, and the interlayer strain to be reduced, thereby suppressing separation of the peripheral rubber at end portions of the auxiliary belt 145. Also, the upper limit described above ensures the effect of suppressing radial growth in the shoulder region in the tread portion by the auxiliary belt 145 described above.

Also, in the pneumatic tire 1, a distance De5 from the tire equatorial plane CL to an outer end portion of the auxiliary belt 145 in the tire width direction has a relationship 0.60≤De5/(TDW/2)≤0.90 with respect to the developed tread half-width TDW/2 (see FIG. 2). The lower limit described above ensures the effect of suppressing radial growth in the shoulder region in the tread portion by the auxiliary belt 145. The upper limit described above suppresses separation of the peripheral rubber at the outer end portion of the auxiliary belt 145.

Additionally, in the pneumatic tire 1, the distance De5 from the tire equatorial plane CL to the outer end portion of the auxiliary belt 145 in the tire width direction has a relationship 0.75≤De5/De1≤0.99 with respect to the distance De1 from the tire equatorial plane CL to the first reinforcing belt 141 (see FIG. 2). The lower limit described above ensures the effect of suppressing radial growth in the shoulder region in the tread portion by the auxiliary belt 145. The upper limit described above suppresses separation of the peripheral rubber at the outer end portion of the auxiliary belt 145.

Also, in the pneumatic tire 1, a distance De5' from the tire equatorial plane CL to an inner end portion of the auxiliary belt 145 in the tire width direction has a relationship 0.10≤De5'/(TDW/2)≤0.40 with respect to the developed tread half-width TDW/2 (see FIG. 2). The lower limit ensures an advantage due to the auxiliary belt 145 having the split structure. The upper limit described above suppresses separation of the peripheral rubber at the outer end portion of the auxiliary belt 145.

Also, in the pneumatic tire 1, a width Wb5 of the auxiliary belt 145 has a relationship 0.40≤Wb5/(TDW/2)≤0.60 with respect to the developed tread half-width TDW/2 (see FIG. 2). The lower limit described above allows for the width Wb5 of the auxiliary belt 145 to be ensured. The upper limit described above ensures an advantage due to the auxiliary belt 145 having the split structure.

Additionally, in the pneumatic tire 1, a cord diameter of a belt cord forming the auxiliary belt 145 is in a range of 2.0 mm or more and 4.5 mm or less. In this way, the cord diameter of the auxiliary belt 145 is appropriately set.

Additionally, in the pneumatic tire 1, a distance De1 from the tire equatorial plane CL to an end portion of the first reinforcing belt 141 has a relationship 0.70≤De1/(TDW/2) ≤0.95 with respect to the developed tread half-width TDW/2 (see FIG. 2). The lower limit described above ensures the hoop effect of the first reinforcing belt 141, and thus the tire shape is appropriately maintained. The upper limit described above suppresses separation of the peripheral rubber at end portions of the first reinforcing belt 141.

Additionally, in the pneumatic tire 1, a distance De2 from the tire equatorial plane CL to an end portion of the second reinforcing belt 142 has a relationship $0.70 \leq De2/(TDW/2) \leq 0.95$ with respect to the developed tread half-width TDW/2 (see FIG. 2). The lower limit described above ensures the hoop effect of the second reinforcing belt 142, and thus the tire shape is appropriately maintained. The upper limit described above suppresses separation of the peripheral rubber at end portions of the second reinforcing belt 142. Furthermore, in a configuration in which the narrower second reinforcing belt 142 is disposed on an outer side of the wider first reinforcing belt 141 in the radial direction (see FIG. 2), the pressing down action of the internal pressure by the second reinforcing belt 142 is increased and the edge strain of the wider first reinforcing belt 141 is effectively reduced in comparison to a configuration in which the narrower reinforcing belt is disposed on an inner side of the wider reinforcing belt in the tire radial direction.

Additionally, in the pneumatic tire 1, the belt layer 14 includes the protection belt 143 disposed on an outer side of the first reinforcing belt 141 and the second reinforcing belt 142 in the radial direction (see FIG. 2). Furthermore, the protection belt 143 has a cord angle of 11° or more and 30° or less. Also, a distance De3 from the tire equatorial plane CL to an end portion of the protection belt 143 has a relationship De1<De3 with respect to the distance De1 to the end portion of the first reinforcing belt 141 and a relationship De2<De3 with respect to the distance De2 to the end portion of the second reinforcing belt 142. In such a configuration, separation of the peripheral rubber at end portions of the first reinforcing belt 141 and the second reinforcing belt 142 is suppressed by the protection belt 143.

Additionally, in the pneumatic tire 1, a distance De3 from the tire equatorial plane CL to an end portion of the protection belt 143 has a relationship $0.80 \leq De3/(TDW/2) \leq 0.99$ with respect to the developed tread half-width TDW/2 (see FIG. 2). The lower limit described above ensures the effect of suppressing separation of the peripheral rubber by the protection belt 143. The upper limit described above suppresses the occurrence of strain due to the protection belt 143 itself being excessively large.

Additionally, in the pneumatic tire 1, a shoulder drop amount Dt of a tread profile when the tire is mounted on a specified rim and inflated to a specified internal pressure has a relationship $0.025 \leq Dt/SH \leq 0.070$ with respect to a tire cross-sectional height SH (see FIG. 1). The lower limit described above allows for the tread gauge in the center region and the shoulder region of the tread portion to be appropriately set, and thus the heat build-up performance of the tire is improved. The upper limit described above allows for the amount of strain in the shoulder region in the tread portion when the tire is rolling to be reduced, and thus the belt edge durability performance of the tire is improved.

Moreover, in the pneumatic tire 1, a distance Gca1 from a tread profile to a carcass profile on the tire equatorial plane CL has a relationship $0.80 \leq Gca1/Gca2 \leq 1.25$ with respect to a distance Gca2 from a tread edge T to a carcass profile (see FIG. 3). The lower limit described above suppresses rising of the shoulder region in the tread portion, and thus the amount of strain in the shoulder region is reduced. In this way, the belt edge durability performance of the tire is improved. The upper limit described above allows for the tread gauge in the center region and the shoulder region of the tread portion to be appropriately set, and thus the heat build-up performance of the tire is improved.

Additionally, in the pneumatic tire 1, a gauge Gtr1 of the tread rubber on the tire equatorial plane CL has a relationship $0.90 \leq Gtr1/Gtr2 \leq 1.35$ with respect to a gauge Gtr2 of the tread rubber at an end portion position of the outermost layer of the belt layer. The lower limit described above suppresses rising of the shoulder region in the tread portion, and thus the amount of strain in the shoulder region is reduced. In this way, the belt edge durability performance of the tire is improved. The upper limit described above allows for the tread gauge in the center region and the shoulder region of the tread portion to be appropriately set, and thus the heat build-up performance of the tire is improved.

Target of Application

The configuration of the pneumatic tire 1 is preferably applied to a low aspect ratio tire for a construction or industrial vehicle. Specifically, the intended tire is an OR tire having an aspect ratio of 70% or less, preferably 65% or less. Such an OR tire with a low aspect ratio can provide improved applied load capacity while maintaining the tire outer diameter, however, such a tire also increases the load index (k-factor) and thus the deflection amount of the tire. Accordingly, there is a problem that separation of the peripheral rubber tends to occur at belt end portions and the amount of heat generation is large. As such, having such an OR tire with low aspect ratio as the target of application produces a remarkable effect of improvement to the belt edge durability performance and heat build-up resistance performance of the tire as described above.

Also, the configuration of the pneumatic tire 1 is preferably applied for an OR tire having an aspect ratio of the carcass layer 13 of 70% or less.

The aspect ratio of the carcass layer is calculated as a ratio of a distance Hca from the maximum diameter position of a rim flange portion of a specified rim to the maximum diameter position of the carcass layer in the radial direction to the maximum width Wca of the carcass layer when the tire is mounted on a specified rim, inflated to a specified internal pressure, and in an unloaded state.

EXAMPLES

FIGS. 4A-4B include a table showing the results of performance tests of pneumatic tires according to embodiments of the technology.

In the performance tests, (1) heat build-up resistance performance and (2) belt edge durability performance were evaluated for a plurality of types of test tires. Test tires having a tire size of 875/65R9 were assembled on a rim having a rim size of 29×27.00–3.5, and an internal pressure of 475 kPa and a load of 15500 kg were applied to the test tires.

(1) In the evaluation of heat build-up resistance performance, an indoor drum testing machine was used, and the temperature inside the tread was measured at a running speed of 10 km/h. The measurement results are expressed as index values and evaluated with the Conventional Example being assigned as the reference (100). In this evaluation, larger values are preferable.

(2) In the evaluation of belt edge durability performance, an indoor drum testing machine was used, the running speed was set to 10 km/h, the load and running speed were increased by 10% every 12 hours, and the running time until the tire breakage was measured. The measurement results are expressed as index values and evaluated with the Conventional Example being assigned as the reference (100). In this evaluation, larger values are preferable.

The test tires of Examples 1 to 18 had the configuration illustrated in FIGS. 1 and 2, and the belt layer 14 was formed by layering a pair of reinforcing belts 141, 142, a pair of protection belts 143, 144, and a single layer and a pair of left and right auxiliary belts 145. Additionally, the reinforcing belts 141, 142 and the auxiliary belt 145 were made from steel cords having a cord diameter of 2.24 mm, and the pair of protection belts 143, 144 were made from steel cords having a cord diameter of 1.82 mm. Additionally, the developed tread half-width TDW/2 was 360 mm, and the tire cross-sectional height SH was 585 mm. Additionally, the cord angle of the carcass layer 13 was 90°, and the aspect ratio of the carcass layer 13 was 45%.

The test tire of the Conventional Example does not include the auxiliary belt 145 in the configuration of FIGS. 1 and 2. In the test tires of the Comparative Example, in the configurations illustrated in FIGS. 1 and 2, the cord angles of the first reinforcing belt 141 and the auxiliary belt 145 were outside the predetermined range.

As can be seen from the test results, the heat build-up resistance performance and the belt edge durability performance of the tire is improved in the test tires of Examples.

The invention claimed is:

1. A pneumatic tire, comprising:

a carcass layer;

a belt layer disposed on an outer side of the carcass layer in a radial direction; and a tread rubber disposed on an outer side of the belt layer in the radial direction, the carcass layer having a cord angle of 80° or more and 100° or less with respect to a tire circumferential direction, the belt layer being formed by layering a first reinforcing belt, a second reinforcing belt that is narrower than the first reinforcing belt, and an auxiliary belt that is spaced apart from a tire equatorial plane and disposed between the carcass layer and the first reinforcing belt, the auxiliary belt being made by performing a rolling process on coating rubber-covered belt cords made of steel, the first reinforcing belt and the second reinforcing belt having cord angles of 11° or more and 30° or less with respect to the tire circumferential direction, and the auxiliary belt having a cord angle of 61° or more and 70° or less with respect to the tire circumferential direction, wherein a distance De5 from the tire equatorial plane to an outer end portion of the auxiliary belt in a tire width direction has a relationship $0.75{\leq}De5/De1{\leq}0.99$ with respect to a distance De1 from the tire equatorial plane to an end portion of the first reinforcing belt, a distance De5' from the tire equatorial plane to an inner end portion of the auxiliary belt in the tire width direction has a relationship $0.05{\leq}De5'/De5{\leq}0.30$ with respect to the distance De5 from the tire equatorial plane to the outer end portion of the auxiliary belt, a cord diameter of a belt cord forming the auxiliary belt is in a range of 2.0 mm or more and 4.5 mm or less, and a number of ends of the belt cords forming the auxiliary belt is in a range of 13 ends/50 mm or more and 20 ends/50 mm or less, the belt layer comprises a first protection belt disposed on an outer side of the first reinforcing belt and the second reinforcing belt in the radial direction, the first protection belt has a cord angle of 11° or more and 30° or less with respect to the tire circumferential direction, and a distance De3 from the tire equatorial plane to an end portion of the first protection belt has a relationship De1<De3 with respect to a distance De1 to an end portion of the first reinforcing belt and a relationship De2<De3 with respect to a distance De2 to an end portion of the second reinforcing belt, and a second protection belt is disposed in a layered manner on an outer side of the first protection belt in the tire radial direction and is narrower than the first protection belt.

2. The pneumatic tire according to claim 1, wherein a distance De5 from the tire equatorial plane to an outer end portion of the auxiliary belt in a tire width direction has a relationship $0.60{\leq}De5/(TDW/2){\leq}0.90$ with respect to a developed tread half-width TDW/2.

3. The pneumatic tire according to claim 1, wherein a distance De5' from the tire equatorial plane to an inner end portion of the auxiliary belt in a tire width direction has a relationship $0.10{\leq}De5'/(TDW/2){\leq}0.40$ with respect to a developed tread half-width TDW/2.

4. The pneumatic tire according to claim 1, wherein a width Wb5 of the auxiliary belt has a relationship $0.40{\leq}Wb5/(TDW/2){\leq}0.60$ with respect to a developed tread half-width TDW/2.

5. The pneumatic tire according to claim 1, wherein a distance De1 from the tire equatorial plane to an end portion of the first reinforcing belt has a relationship $0.70{\leq}De1/(TDW/2){\leq}0.95$ with respect to a developed tread half-width TDW/2.

6. The pneumatic tire according to claim 1, wherein a distance De2 from the tire equatorial plane to an end portion of the second reinforcing belt has a relationship $0.70{\leq}De2/(TDW/2){\leq}0.95$ with respect to a developed tread half-width TDW/2.

7. The pneumatic tire according to claim 1, wherein the belt layer comprises a protection belt disposed on an outer side of the first reinforcing belt and the second reinforcing belt in the radial direction, and a distance De3 from the tire equatorial plane to an end portion of the protection belt has a relationship $0.80{\leq}De3/(TDW/2){\leq}0.99$ with respect to a developed tread half-width TDW/2.

8. The pneumatic tire according to claim 1, wherein a shoulder drop amount Dt of a tread profile when the tire is mounted on a specified rim and inflated to a specified internal pressure has a relationship $0.025{\leq}Dt/SH{\leq}0.070$ with respect to a tire cross-sectional height SH.

9. The pneumatic tire according to claim 1, wherein a distance Gca1 from a tread profile to a carcass profile on the tire equatorial plane has a relationship $0.80{\leq}Gca1/Gca2{\leq}1.25$ with respect to a distance Gca2 from a tread edge to a carcass profile.

10. The pneumatic tire according to claim 1, wherein a gauge Gtr1 of the tread rubber on the tire equatorial plane has a relationship $0.90{\leq}Gtr1/Gtr2{\leq}1.35$ with respect to a gauge Gtr2 of the tread rubber at an end portion position of an outermost layer of the belt layer.

11. The pneumatic tire according to claim 1, wherein the pneumatic tire is an OR tire for a construction or industrial vehicle having an aspect ratio of 70% or less.

12. The pneumatic tire according to claim 1, wherein an aspect ratio of the carcass layer is 70% or less.

13. A pneumatic tire, comprising:

a carcass layer;

a belt layer disposed on an outer side of the carcass layer in a radial direction; and a tread rubber disposed on an outer side of the belt layer in the radial direction, the carcass layer having a cord angle of 80° or more and 100° or less with respect to a tire circumferential direction, the belt layer being formed by layering a first reinforcing belt, a second reinforcing belt that is narrower than the first reinforcing belt, and an auxiliary belt that is spaced apart from a tire equatorial plane and disposed between the carcass layer and the first reinforcing belt, the first and second reinforcing belts being made by performing a rolling process on coating rubber-covered belt cords made of steel, the first reinforcing belt and the second reinforcing belt having cord angles of 11° or more and 30° or less with respect to the tire circumferential direction, and the auxiliary belt having a cord angle of 55° or more and 70° or less with respect to the tire circumferential direction, wherein the belt layer comprises a protection belt disposed on an outer side of the first reinforcing belt and the second reinforcing belt in the radial direction, the protection belt has a cord angle of 11° or more and 30° or less with respect to the tire circumferential direction, the protection belt comprises rubber-covered belt cords made of steel and is made by performing a rolling process, a distance $De3$ from the tire equatorial plane to an end portion of the protection belt has a relationship $De1 < De3$ with respect to a distance $De1$ to an end portion of the first reinforcing belt and a relationship $De2 < De3$ with respect to a distance $De2$ to an end portion of the second reinforcing belt, a distance $De5'$ from the tire equatorial plane to an inner end portion of the auxiliary belt in the tire width direction has a relationship $0.05 \le De5'/De5 \le 0.30$ with respect to a distance $De5$ from the tire equatorial plane to an outer end portion of the auxiliary belt, an outer diameter of the belt cord forming the first and second reinforcing belts is in a range of 2.0 mm or more and 4.5 mm or less, a number of ends of the belt cords forming the first and second reinforcing belts is in a range of 14 ends/50 mm or more and 22 ends/50 mm or less, and a cord diameter of the belt cord forming the protection belt is narrower than the cord diameter of the belt cords of the first and second reinforcing belt.

14. The pneumatic tire according to claim 13, wherein the protection belt is wider than each of the first reinforcing belt and the second reinforcing belt, and the protection belt is disposed to entirely cover the first reinforcing belt and the second reinforcing belt from an outer side in the radial direction.

15. A pneumatic tire, comprising:

a carcass layer;

a belt layer disposed on an outer side of the carcass layer in a radial direction; and a tread rubber disposed on an outer side of the belt layer in the radial direction, the carcass layer having a cord angle of 80° or more and 100° or less with respect to a tire circumferential direction, the belt layer being formed by layering a first reinforcing belt, a second reinforcing belt that is narrower than the first reinforcing belt, and an auxiliary belt that is spaced apart from a tire equatorial plane and disposed between the carcass layer and the first reinforcing belt, the auxiliary belt being made by performing a rolling process on coating rubber-covered belt cords made of steel, the first and second reinforcing belts being made by performing a rolling process on coating rubber-covered belt cords made of steel, the first reinforcing belt and the second reinforcing belt having cord angles of 11° or more and 30° or less with respect to the tire circumferential direction, and the auxiliary belt having a cord angle of 55° or more and 70° or less with respect to the tire circumferential direction, wherein a distance $De5$ from the tire equatorial plane to an outer end portion of the auxiliary belt in a tire width direction has a relationship $0.75 \le De5/De1 \le 0.99$ with respect to a distance $De1$ from the tire equatorial plane to an end portion of the first reinforcing belt, a distance $De5'$ from the tire equatorial plane to an inner end portion of the auxiliary belt in the tire width direction has a relationship $0.05 \le De5'/De5 \le 0.30$ with respect to the distance $De5$ from the tire equatorial plane to the outer end portion of the auxiliary belt, a distance $De2$ from the tire equatorial plane to an end portion of the second reinforcing belt is less than the distance $De5$ from the tire equatorial plane to the outer end portion of the auxiliary belt in the tire width direction, an outer diameter of the belt cord forming the first and second reinforcing belts is in a range of 2.0 mm or more and 4.5 mm or less, a number of ends of the belt cords forming the first and second reinforcing belts is in a range of 14 ends/50 mm or more and 22 ends/50 mm or less, a cord diameter of a belt cord forming the auxiliary belt is in a range of 2.0 mm or more and 4.5 mm or less, and a number of ends of the belt cords forming the auxiliary belt is in a range of 13 ends/50 mm or more and 20 ends/50 mm or less.

* * * * *